United States Patent
Liu et al.

(10) Patent No.: US 7,660,080 B1
(45) Date of Patent: Feb. 9, 2010

(54) READ/WRITE HEAD WITH DYNAMIC FLYING HEIGHT CONTROL BY MAGNETOSTRICTION

(75) Inventors: Francis H. Liu, Fremont, CA (US);
Kroum S. Stoev, Fremont, CA (US);
Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1203 days.

(21) Appl. No.: 10/837,490

(22) Filed: Apr. 30, 2004

(51) Int. Cl.
*G11B 5/56* (2006.01)
*G11B 21/24* (2006.01)

(52) U.S. Cl. .................... 360/294.7; 360/128
(58) Field of Classification Search .......... 360/75, 360/270, 274, 294, 294.7, 328, 128
See application file for complete search history.

(56) References Cited

U.S. PATENT DOCUMENTS

| | | |
|---|---|---|
| 5,021,906 A | 6/1991 | Chang et al. |
| 5,712,463 A | 1/1998 | Singh et al. |
| 5,943,189 A | 8/1999 | Boutaghou et al. |
| 5,991,113 A | 11/1999 | Meyer et al. |
| 6,111,724 A | 8/2000 | Santini |
| 6,344,949 B1 | 2/2002 | Albrecht et al. |
| 6,359,746 B1 | 3/2002 | Kakekado et al. |
| 6,493,183 B1 | 12/2002 | Kasiraj et al. |
| 6,501,606 B2 | 12/2002 | Boutaghou et al. |
| 6,504,676 B1 | 1/2003 | Hiner et al. |
| 6,529,342 B1 | 3/2003 | Feng et al. |
| 6,570,730 B1 | 5/2003 | Lewis et al. |
| 6,577,466 B2 | 6/2003 | Meyer et al. |
| 6,597,539 B1 | 7/2003 | Stupp et al. |
| 6,707,646 B2 | 3/2004 | Berger et al. |
| 6,775,103 B2 | 8/2004 | Kang et al. |
| 6,791,793 B1 | 9/2004 | Chen et al. |
| 6,813,115 B2 | 11/2004 | Van der Heijden et al. |

(Continued)

FOREIGN PATENT DOCUMENTS

| | | | |
|---|---|---|---|
| JP | 03154240 A | * | 7/1991 |
| JP | 05-020635 | | 1/1993 |
| JP | 05151734 A | * | 6/1993 |

OTHER PUBLICATIONS

P. Machtle et al, "Integrated Microheaters for In-Situ Flying Height Control of Sliders Used in Hard-Disk Drives" IEEE 2001, pp. 196-199.

(Continued)

*Primary Examiner*—William J Klimowicz
(74) *Attorney, Agent, or Firm*—Barcelo & Harrison, LLP

(57) ABSTRACT

A read/write head for use in a data storage device to control the low dynamic flying height in order to achieve high data recording storage capacity of magnetic hard drives. The read/write head is designed for use in a data storage device that includes a storage medium having a recording surface. The head comprises a pole tip region and an actuator. In turn, the actuator includes an excitation source for generating a magnetic field, and a magnetostrictive plate for expanding in response to the magnetic field, resulting in a protrusion in a section of the pole tip region along a direction towards the recording surface, so that the head flies above the recording surface at a flying height lower than a nominal flying height.

57 Claims, 10 Drawing Sheets

U.S. PATENT DOCUMENTS

| | | |
|---|---|---|
| 6,816,339 B1 | 11/2004 | Litvinov et al. |
| 6,822,829 B2 | 11/2004 | Minor et al. |
| 6,834,026 B2 | 12/2004 | Fullerton et al. |
| 6,847,509 B2 | 1/2005 | Yoshikawa et al. |
| 6,920,020 B2 | 7/2005 | Yamanaka et al. |
| 6,922,311 B2 | 7/2005 | Kobayashi |
| 6,934,113 B1* | 8/2005 | Chen .......................... 360/75 |
| 6,963,464 B2 | 11/2005 | Xu et al. |
| 6,992,865 B2* | 1/2006 | Thurn et al. ............. 360/294.7 |
| 7,023,660 B2 | 4/2006 | Hsiao et al. |
| 7,092,195 B1 | 8/2006 | Liu et al. |
| 7,133,254 B2 | 11/2006 | Hamann et al. |
| 7,154,696 B2* | 12/2006 | Nikitin et al. ................. 360/75 |
| 7,199,982 B2 | 4/2007 | Suk |
| 7,224,547 B2 | 5/2007 | Suk |
| 7,224,553 B2 | 5/2007 | Sasaki et al. |
| 7,290,324 B2 | 11/2007 | Fontana, Jr. et al. |
| 7,372,665 B1 | 5/2008 | Stoev et al. |
| 7,428,124 B1 | 9/2008 | Song et al. |
| 7,430,098 B1 | 9/2008 | Song et al. |
| 2002/0024774 A1 | 2/2002 | Berger et al. |
| 2003/0011932 A1 | 1/2003 | Mei et al. |
| 2003/0099054 A1 | 5/2003 | Kamijima |
| 2003/0235014 A1 | 12/2003 | Yamanaka et al. |
| 2004/0051996 A1 | 3/2004 | Kautzky |
| 2004/0075940 A1 | 4/2004 | Bajorek et al. |
| 2004/0130820 A1 | 7/2004 | Ota |
| 2004/0165305 A1 | 8/2004 | Nishiyama |
| 2004/0184192 A1 | 9/2004 | Ota et al. |
| 2004/0218302 A1 | 11/2004 | Maat |
| 2004/0240109 A1 | 12/2004 | Hamann et al. |
| 2005/0013034 A1 | 1/2005 | Margulies et al. |
| 2005/0018347 A1 | 1/2005 | Hsiao et al. |
| 2005/0024775 A1 | 2/2005 | Kurita et al. |
| 2005/0088784 A1* | 4/2005 | Macken et al. ........... 360/294.3 |
| 2005/0117242 A1 | 6/2005 | Taguchi |
| 2005/0243473 A1* | 11/2005 | Hu et al. .................. 360/294.3 |
| 2006/0034013 A1 | 2/2006 | Kato et al. |
| 2006/0102956 A1 | 5/2006 | Kamarajugadda et al. |
| 2008/0030905 A1 | 2/2008 | Yamanaka et al. |

OTHER PUBLICATIONS

R.M. Costescu, et al., "Ultra-Low Thermal Conductivity in W/A1203 Nanolaminates", Science, vol. 303, Issue 5660, pp. 989-990, Feb. 13, 2004.

Institute of Electrical and Electronic Engineers, Inc., The IEEE Standard Dictionary of Electrical and Electronics Terms, sixth edition, IEEE Std. 100-1996, p. 171.

Gordon J. Smith, "Dynamic In-Situ Measurements of Head-to-Disk Spacing", IEEE Transactions on Magnetics, vol. 35, No. 5, Sep. 1999, pp. 2346-2351.

Vladimir Nikitin, et al.. "Spatial and Temporal Profiling of Protrusion in Magnetic Recording Heads", IEEE Transactions on Magnetics, vol. 40, No. 1, Jan. 2004, pp. 326-331.

* cited by examiner

READ/WRITE HEAD WITH DYNAMIC FLYING HEIGHT CONTROL BY MAGNETOSTRICTION

FIELD OF THE INVENTION

The present invention generally relates to data storage devices such as disk drives, and it particularly relates to a read/write head for use in such data storage devices. More specifically, the present invention provides a method of incorporating a new type of actuators comprising a magnetostrictive plate and magnetic excitation coils into the read/write head for dynamic flying height control during a read/write operation. The expansion of the magnetostrictive plate during actuation results in a reduction of the magnetic spacing between the read/write head and the magnetic medium to achieve higher data recording capacity of magnetic disks.

BACKGROUND OF THE INVENTION

An exemplary conventional read/write head comprises a thin film write element with a bottom pole P1 and a top pole P2. The pole P1 has a pole tip height dimension commonly referenced as "throat height". In a finished write element, the throat height is measured between the ABS and a zero throat level where the pole tip of the write element transitions to a back region. The ABS is formed by lapping and polishing the pole tip. A pole tip region is defined as the region between the ABS and the zero throat level. Similarly, the pole P2 has a pole tip height dimension commonly referred to as "nose length". In a finished read/write head, the nose is defined as the region of the pole P2 between the ABS and the "flare position" where the pole tip transitions to a back region.

Pole P1 and pole P2 each have a pole tip located in the pole tip region. The tip regions of pole P1 and pole P2 are separated by a recording gap that is a thin layer of non-magnetic material. During a write operation, the magnetic field generated by pole P1 channels the magnetic flux from pole P1 to pole P2 through an intermediary magnetic disk, thereby causing the digital data to be recorded onto the magnetic disk.

The magnetic read/write head is coupled to a rotary actuator magnet and a voice coil assembly by a suspension and an actuator arm positioned over a surface of a spinning magnetic disk. In operation, a lift force is generated by the aerodynamic interaction between the read/write head and the spinning magnetic disk. The lift force is opposed by equal and opposite spring forces applied by the suspension such that a predetermined flying height is maintained over a full radial stroke of the rotary actuator assembly above the surface of the spinning magnetic disk.

The flying height is defined as the magnetic spacing between the surface of the spinning magnetic disk and the lowest point of the slider assembly. One objective of the design of magnetic read/write heads is to obtain a very small flying height between the read/write element and the disk surface. With the ever increasing areal density, by maintaining a flying height as close to the magnetic disk as practically feasible, it is possible to record short wavelength or high frequency signals, thereby achieving high density and high storage data recording capacity.

A significant design challenge in a conventional read/write head is to achieve an ultra low flying height without causing physical damage to either the slider or the disk that may result in reliability problems and head crashes. Such as damage could cause both accelerated wear and performance degradation. The wear effect is due to the abrasive contact between the slider and the disk, which tends to cause the slider off track, thereby causing errors in the track following capability of the read/write head.

Typically, during operation, the magnetic read/write head is subjected to various mechanical and thermal conditions that tend to compromise the ability to attain the ultra low flying height in a conventional read/write head. For example, ambient pressure variations in the hard disk operating condition may contribute to the flying height variations. Similarly, mechanical disturbances during operation, such as vibration, also pose as a source of difficulty in maintaining the ultra low flying height.

Furthermore, during a typical operation, the magnetic disk spins at a rapid rate of rotation, typically on the order of several thousands revolutions per minute (RPM). This rapid rotation is a source of friction in the ambient air between the ABS and the spinning magnetic disk, causing an elevation in the operation temperature of the read/write head.

Additionally, the read/write head is also subjected to various other thermal sources of power dissipation resulting from the motor heating, current supplied to the write coils, eddy current in the core, and the current in the read sensor. The power dissipation manifests itself as a localized heating of the read/write head, resulting in a further temperature rise of the read/write head.

The combined mechanical and thermal effect therefore generally render the pole tip of the read/write head in a very close proximity to the magnetic disk in an uncontrolled manner that may possibly cause a physical interference of the read/write head.

In an attempt to resolve the foregoing problem, a number of conventional designs of read/write heads incorporate the use of heater coils to control the dynamic flying height of the read/write head.

Although this technology may have proven to be useful in controlling the dynamic flying height of the read/write head, it is still not entirely satisfactory in practice. Due to the reliance on the thermal expansion effect as a means to control the dynamic flying height, the response time is relatively slow. Since the ultra low flying height is typically lower than 12.5 nm, a flying height that is lower than 10 nm could cause a reliability problem.

Therefore, there remains a need for a read/write head that is capable of controlling the ultra low dynamic flying height during a read/write operation without causing undesirable pole tip protrusion during idle flying time. The need for such a design has heretofore remained unsatisfied.

SUMMARY OF THE INVENTION

The present invention can be regarded as a read/write head for use in a data storage device to control the ultra low dynamic flying height in order to achieve high data recording storage capacity of magnetic hard drives. The read/write head is designed for use in a data storage device that includes a storage medium having a recording surface.

The head comprises a pole tip region and an actuator. In turn, the actuator includes an excitation source for generating a magnetic field, and a magnetostrictive plate for expanding in response to the magnetic field, resulting in a protrusion in a section of the pole tip region along a direction towards the recording surface, so that the head flies above the recording surface at a flying height lower than a nominal flying height.

According to one embodiment, the actuator is placed within the read/write head at any one or more of a plurality of possible locations such as behind the first pole, the second pole, the third pole, the first shield, the second shield, or any other suitable location. Alternatively, the actuator may be placed in the middle of the overcoat layer.

According to another embodiment, a non-magnetic stop material is disposed at one end of the magnetostrictive plate, remotely from the ABS, in order to limit the pole tip expansion in the direction away from the ABS.

According to yet another embodiment, the magnetic coil provides a resistance heating for additional control of the dynamic flying height in addition to the magnetostriction effect.

DETAILED DESCRIPTION OF PREFERRED EMBODIMENTS

Figure 1:
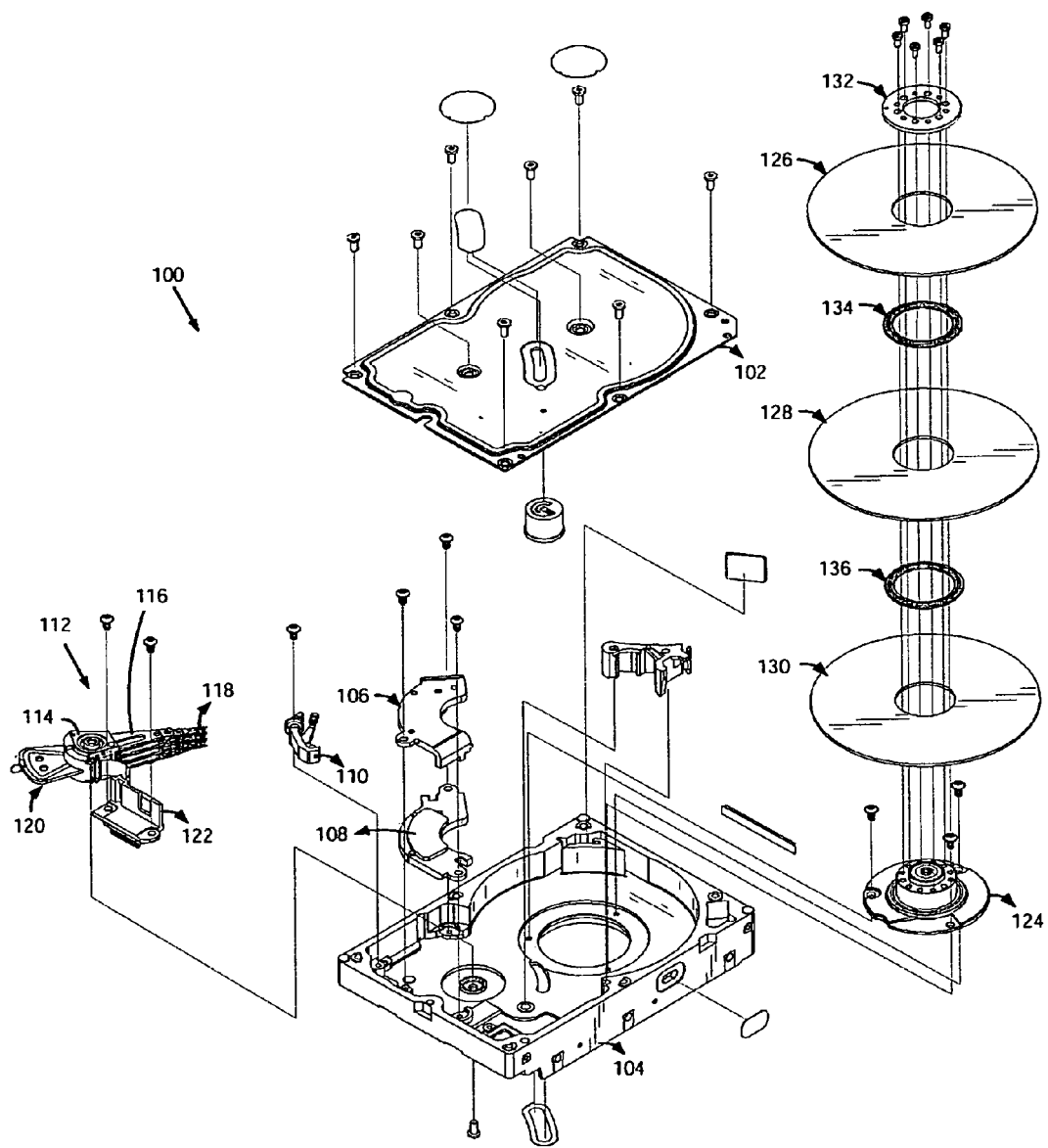
FIG. 1 is a fragmentary perspective view of a data storage device utilizing a read/write head of the present invention.

FIG. 1 illustrates a hard disk drive 100 in which an embodiment of the present invention may be used. An enclosure of the hard disk drive 100 comprises a cover 102 and a base 104. The enclosure is suitably sealed to provide a relatively contaminant-free interior for a head disk assembly (HDA) portion of the hard disk drive 100. The hard disk drive 100 also comprises a printed circuit board assembly (not shown) that is attached to base 104 and further comprises the circuitry for processing signals and controlling operations of the hard disk drive 100.

Within its interior, the hard disk drive 100 comprises a magnetic disk 126 having a recording surface typically on each side of the disk, and comprises a magnetic head or slider that may suitably be a magneto-resistive ("MR") head such as a GMR head. The GMR head has an MR element for reading stored data on a recording surface and an inductive element for writing data on the recording surface. The exemplary embodiment of the hard disk drive 100 illustrated in FIG. 1 comprises three magnetic disks 126, 128, and 130 providing six recording surfaces, and further comprises six magnetic heads.

Disk spacers such as spacers 134 and 136 are positioned between magnetic disks 126, 128, 130. A disk clamp 132 is used to clamp disks 126, 128, 130 on a spindle motor 124. In alternative embodiments, the hard disk drive 100 may comprise a different number of disks, such as one disk, two disks, and four disks and a corresponding number of magnetic heads for each embodiment. The hard disk drive 100 further comprises a magnetic latch 110 and a rotary actuator arrangement. The rotary actuator arrangement generally comprises a head stack assembly 112 and voice coil magnet ("VCM") assemblies 106 and 108. The spindle motor 124 causes each magnetic disk 126, 128, 130 positioned on the spindle motor 124 to spin, preferably at a constant angular velocity.

A rotary actuator arrangement provides for positioning a magnetic head over a selected area of a recording surface of a disk. Such a rotary actuator arrangement comprises a permanent-magnet arrangement generally including VCM assemblies 106, 108, and head stack assembly 112 coupled to base 104. A pivot bearing cartridge is installed in a bore of the head stack assembly 112 and comprises a stationary shaft secured to the enclosure to define an axis of rotation for the rotary actuator arrangement.

The head stack assembly 112 comprises a flex circuit assembly and a flex bracket 122. The head stack assembly 112 further comprises an actuator body 114, a plurality of actuator arms 116 cantilevered from the actuator body 114, a plurality of head gimbal assemblies 118 each respectively attached to an actuator arm 116, and a coil portion 120. The number of actuator arms 116 and head gimbal assemblies 118 is generally a function of the number of magnetic disks in a given hard disk drive 100.

Figure 2:
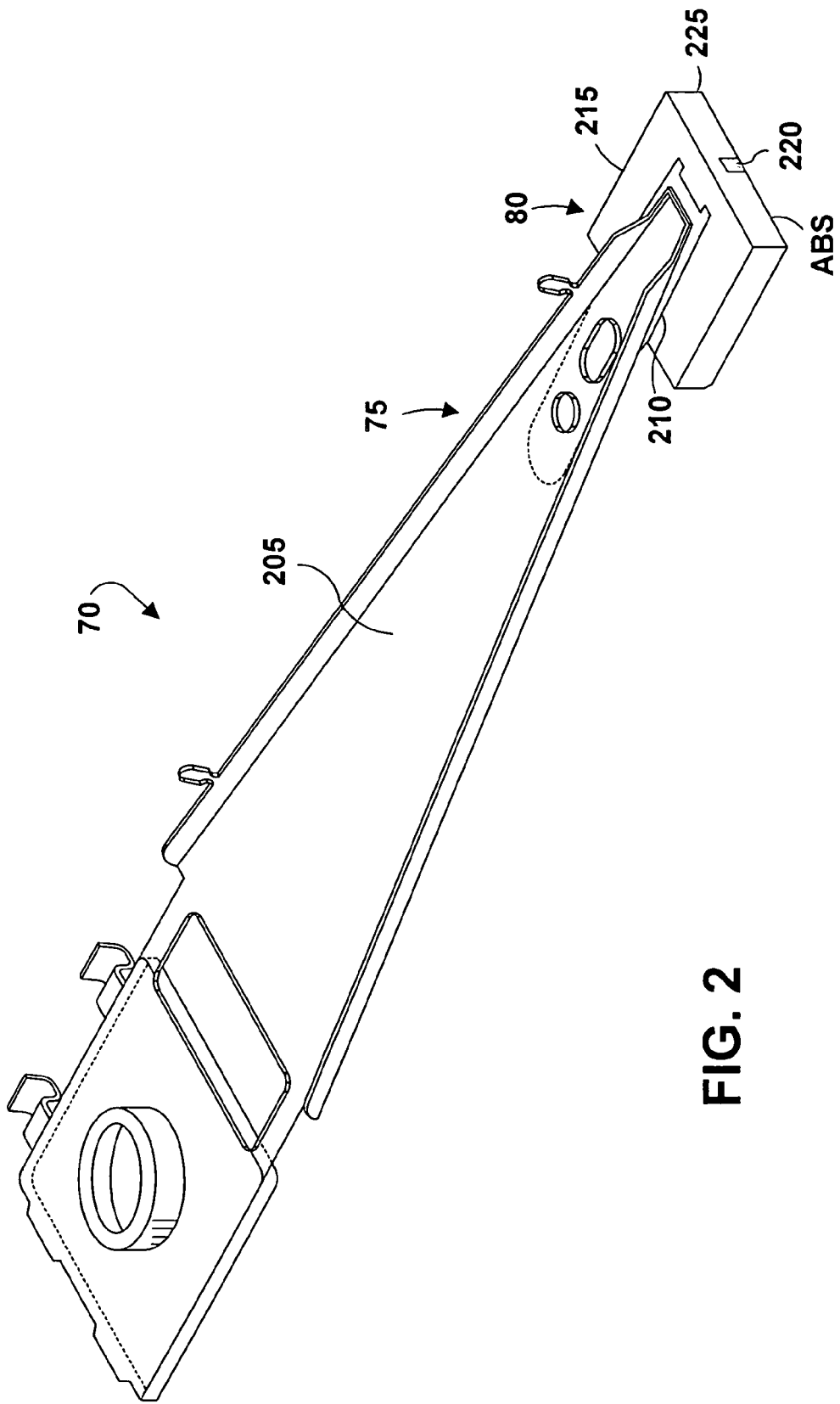
FIG. 2 is a perspective view of a head gimbal assembly comprised of a suspension, and a slider to which the read/write head of FIG. 1 is secured, for use in a head stack assembly.

Each of the head gimbal assemblies (HGA) 118 is secured to one of the actuator arms 116. As illustrated in FIG. 2, a HGA 70 is comprised of a suspension 75 and a read/write head 80. The suspension 75 comprises a resilient load beam 205 and a flexure 210 to which the read/write head 80 is secured.

The read/write head 80 comprises a slider 215 secured to the free end of the resilient load beam 205 by means of flexure 210 and a read/write element 220 supported by slider 215. In the example illustrated in FIG. 2, the read/write element 220 is secured to the trailing edge 225 of slider 215. Slider 215 can be any conventional or available slider. In another embodiment, more than one read/write element 220 can be secured to the trailing edge 225 or other side(s) of slider 215.

Figure 3:
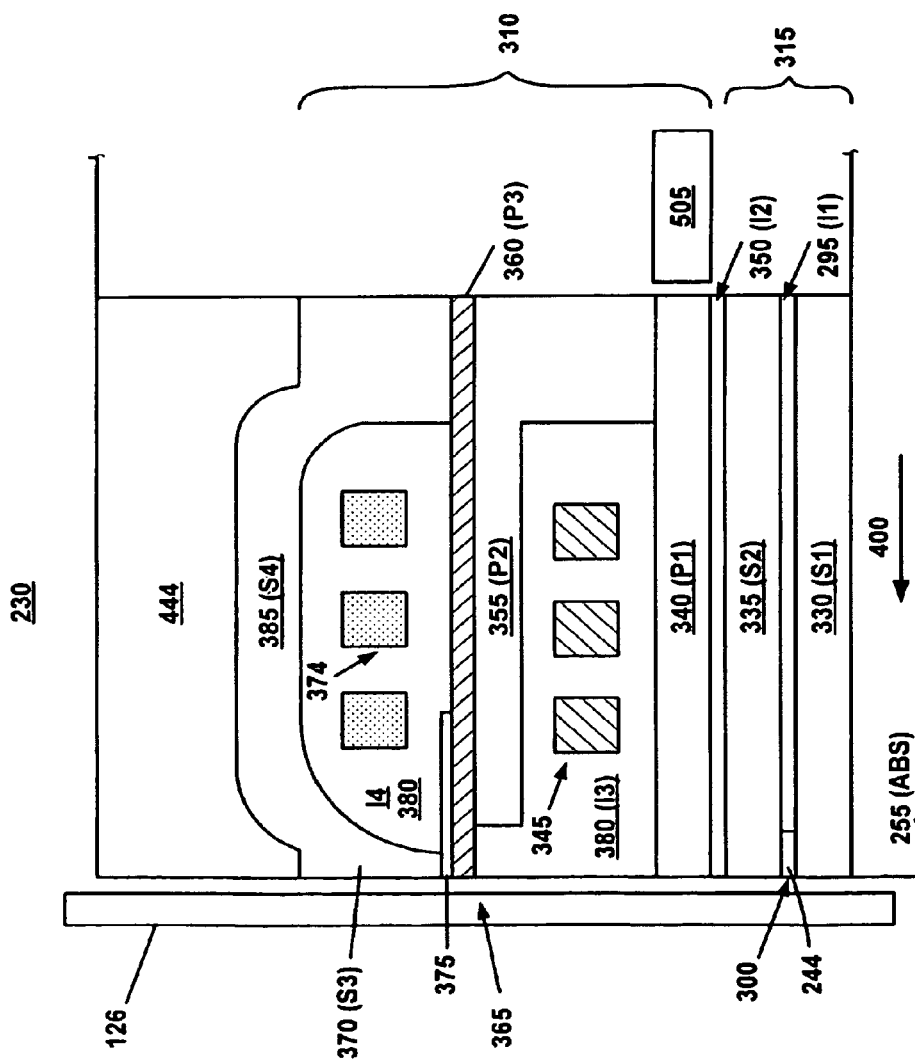
FIG. 3 is a cross-sectional view of an exemplary perpendicular recording read/write head of FIGS. 1 and 2, incorporating the actuator, according to one embodiment of the present invention.

FIG. 3 is a cross-sectional view of a read/write element 230, shown incorporating an actuator 505 according to the present invention. The read/write element 230 integrates a write element 310 and a read element 315.

The read element 315 is formed of a first shield (S1) layer 330 preferably made of a material that is both magnetically and electrically conductive. For example, the S1 layer 290 can have a nickel-iron (NiFe) composition, such as Permalloy, or a ferromagnetic composition with high permeability. The S1 layer 330 has a thickness of approximately about 2 µm and one of its distal ends terminating at the ABS 255.

A first insulating (I1) layer 295 is formed over substantially the entire surface of the S1 layer 330 to define a non-magnetic, transducing read gap 300. The I1 layer 295 can be made of any suitable material, for example alumina (Al2O3), aluminum oxide, or silicon nitride.

The read element 315 also includes a read sensor 244 that is formed within the I1 layer 295. The read sensor 244 can be any suitable sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, a giant magnetoresistive (GMR) sensors, and colossal magnetoresistive (CMR) sensors. Other electromagnetic sensors, such as optical sensors, can alternatively be employed to sense magnetic fields from the medium.

The read element 315 further comprises a second shield layer (S2) 335 that is made of an electrically and magnetically conductive material that may be similar or equivalent to that of the S1 layer 330. The S2 layer 335 is formed over substantially the entire surface of the insulating layer (not shown) and has a thickness that can be substantially similar or equivalent to that of the S1 layer 330. A piggyback gap is formed on the S2 layer 335.

The write element 310 is comprised of a first pole layer (P1) 340 that extends, for example, integrally from the piggyback gap. The P1 layer 340 is made of a magnetically conductive material. A first coil layer 345 comprises conductive coil elements. The first coil layer 345 also forms part of the write element 310, and is formed within an insulating layer (I2) 380. The first coil layer 345 may comprise a single layer of, for example, 1 to 30 turns, though a different number of turns can alternatively be selected depending on the application or design.

A second pole layer (P2) 355 is made of a magnetically conductive material, and may be, for example, similar to that of the S1 layer 330 and the P1 layer 340. The thickness of the P2 layer 355 can be substantially the same as, or similar to, that of the S1 layer 330.

A third pole layer (P3) 360 is made of a hard magnetic material with a high saturation magnetic moment Bs. In one embodiment, the P3 layer 360 can be made, for example, of CoFeN, CoFeNi, and CoFe.

A pole tip region 365 comprises the P3 layer 360, the P2 layer 355, and the portion of the P1 layer 340 near the air bearing surface (ABS) of the read/write element 230. The writing element 310 further comprises a third shield layer (shield 3) 370.

An insulating layer (I4) 380 is formed between the P3 layer 360 and the S3 layer 370 to define a write gap 375. The insulating layer I4 can be made of any suitable material, for example alumina ($Al_2O_3$), aluminum oxide, or silicon nitride.

A second coil layer 374 comprises conductive coil elements. The second coil layer 374 forms part of the write element 310, and is formed within an insulating layer (I4) 380. The second coil layer 374 may comprise a single layer of, for example, 1 to 30 turns, though a different number of turns can alternatively be selected depending on the application or design.

A fourth shield layer (S4) 385 (also referred to as the upper shield 385) covers a portion of the I3 layer 380. The S4 layer 385 is made of a material that is both magnetically and electrically conductive, and may be, for example, similar to that of the S1 layer 330 and the P1 layer 340. An insulation overcoat 444 overlays shield layer S4.

Figure 4:
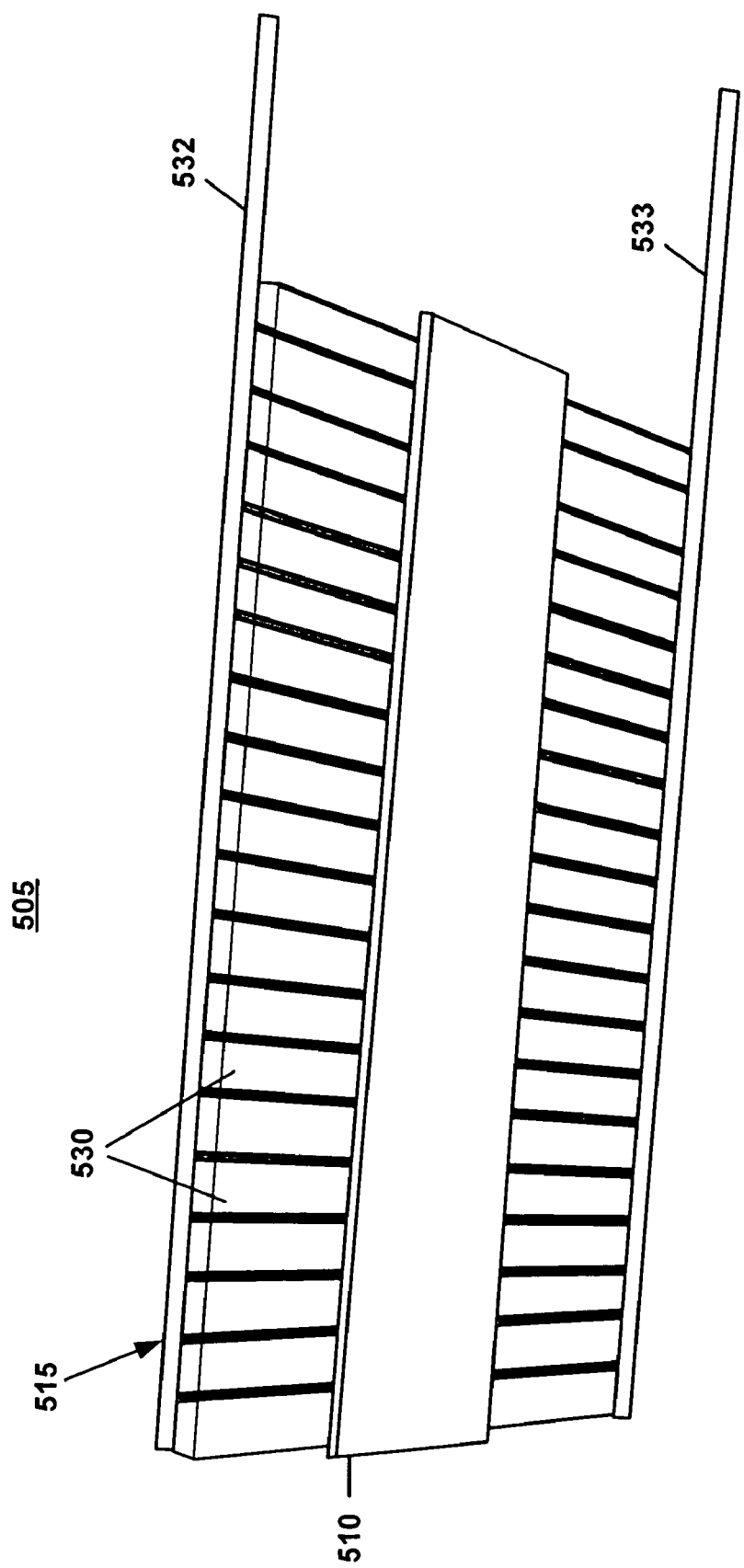
FIG. 4 is a perspective view of the actuator of FIG. 3, comprising a magnetostrictive plate and an excitation source.

Referring now to FIG. 4, the actuator 505 is comprised of a magnetostrictive plate 510 and an excitation source 515. The magnetostrictive plate 510 is formed by a plating or sputtering process using a material that exhibits a magnetic property known as magnetostriction. Physically, the magnetostrictive plate 510 changes its shape and dimension upon being saturated by a magnetic field. According to the present invention, the magnetostrictive plate 510 may be composed of any suitable material with a magnetostriction of approximately $5 \times 10^{-5}$ or greater, including but not limited to the combination of: cobalt; nickel; iron; rare earth material; their oxides; and additives of oxygen, nitrogen, fluoride, or boron.

The excitation source 515 is comprised of a plurality of magnetic coils 530 that are spaced tightly together in close proximity to the magnetostrictive plate 510. For example only, the magnetostrictive plate 510 may be separated from the magnetic coils 530 by a distance of less than 1 μm. The magnetic coils 530 are generally formed by a plating process and can be of any suitable shape such as a rectangular shape as illustrated in FIG. 4. A pair of electrical leads 532, 533 connect the various coils 530 of the excitation source 515, and conduct a current therethrough, to generate the excitation saturation magnetic field.

The magnetostrictive plate 510 may assume various shapes, such as a rectangular shape (FIG. 4), a trapezoidal shape (FIG. 5), a square, an elliptical, or any other suitable shape.

Figure 5:
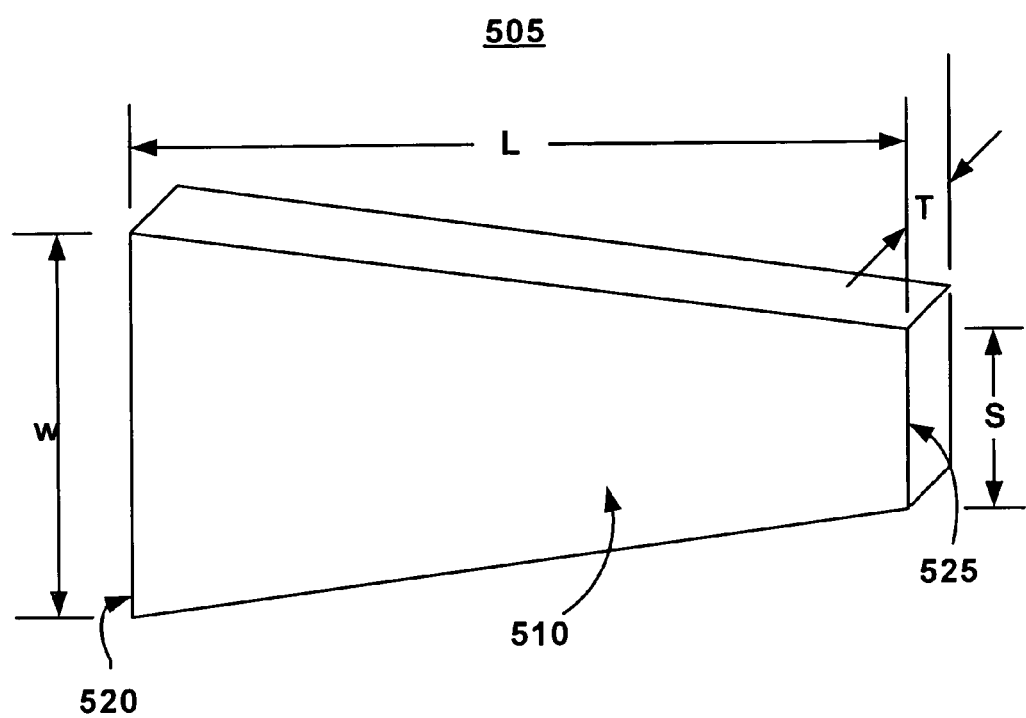
FIG. 5 is a perspective view of the magnetostrictive plate of FIG. 4.

With further reference to FIG. 5, the magnetostrictive plate 510 is generally shaped as a trapezoid having a thickness T, a length L, a forward facing edge 520 of a width W, and a shorter edge 525 of a width S that is oppositely disposed relative the forward facing edge 520. For example only, the thickness T may be about 1 μm and the length L may be about 100 μm. The widths W and S may range from approximately 1 to 100 μm.

The length of the magnetic coils 530 (FIG. 4) is generally greater than the width of the forward facing edge 520 of the magnetostrictive plate 510, to ensure that the magnetic coils 530 produce a uniform magnetic field relative to the magnetostrictive plate 510. The magnetic coils 530 are so arranged that they span or extend beyond the length of the magnetostrictive plate 510, to ensure magnetization saturation of the magnetostrictive plate 510.

The actuator 505 may be disposed behind any one of the pole layers (P1) 340, (P2) 355, or (P3) 360; behind any one of the shield layers (S1) 330, (S2) 335, (S3) 370, or (S4) 385; behind the read gap 300; or behind the write gap 375. For example purpose only, FIG. 3 illustrates the actuator 505 disposed immediately behind the P1 layer 340, with the understanding that it can alternatively be placed in any other aforementioned location within the read/write element 230.

With further reference to FIG. 3, the magnetostrictive plate 510 of the actuator 505 is disposed with its length aligned along an axis that is substantially perpendicular to the ABS surface of the head. Furthermore, the magnetostrictive plate 510 is oriented with its forward facing edge 520 disposed in the forward direction toward the ABS. This orientation is designed to ensure that the actuator 505 undergoes a greater dimensional change in the forward direction to result in a protrusion of the pole tip region 365 toward the magnetic disk 126.

Figure 6:
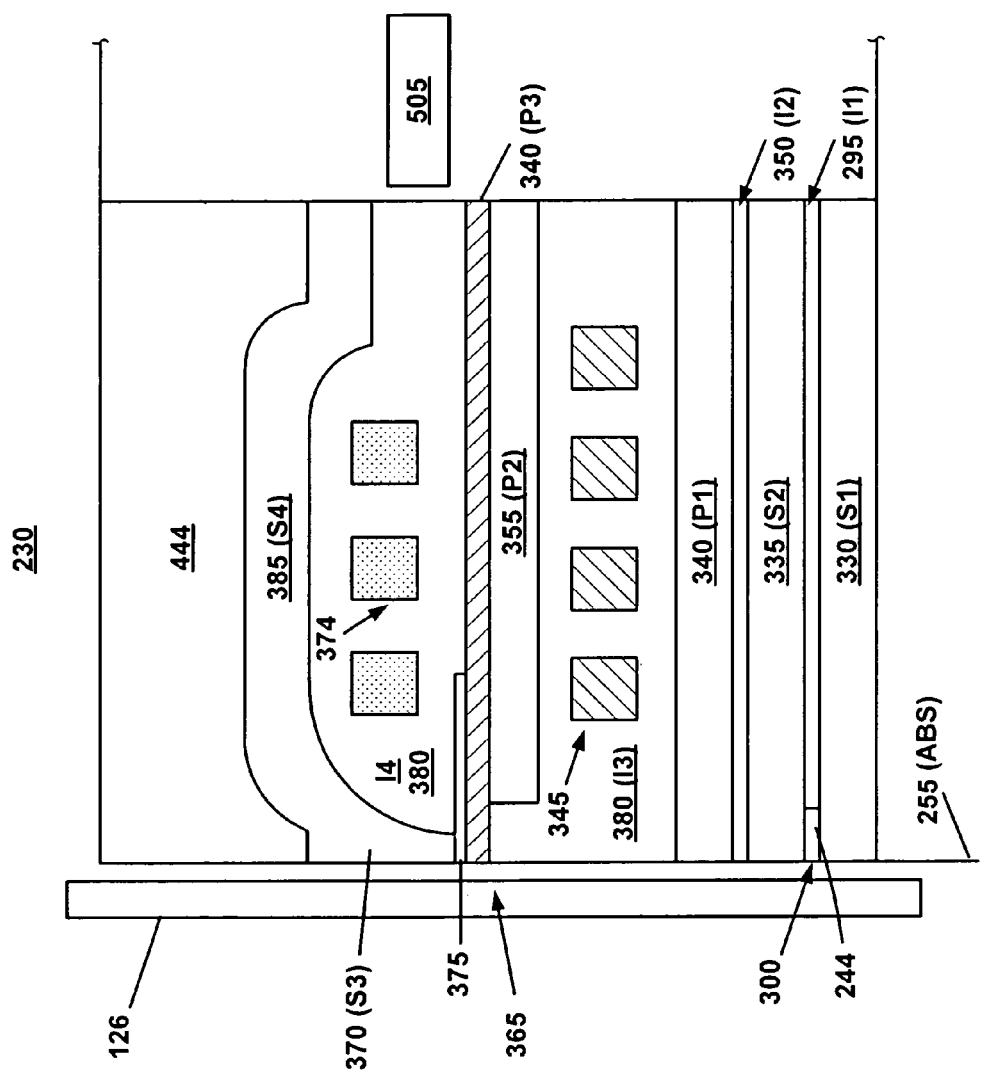
FIG. 6 is a cross-sectional view of the read/write head of FIGS. 1 and 2, showing the actuator located behind a second coil layer, according to an alternative embodiment of the present invention.
Figure 7:
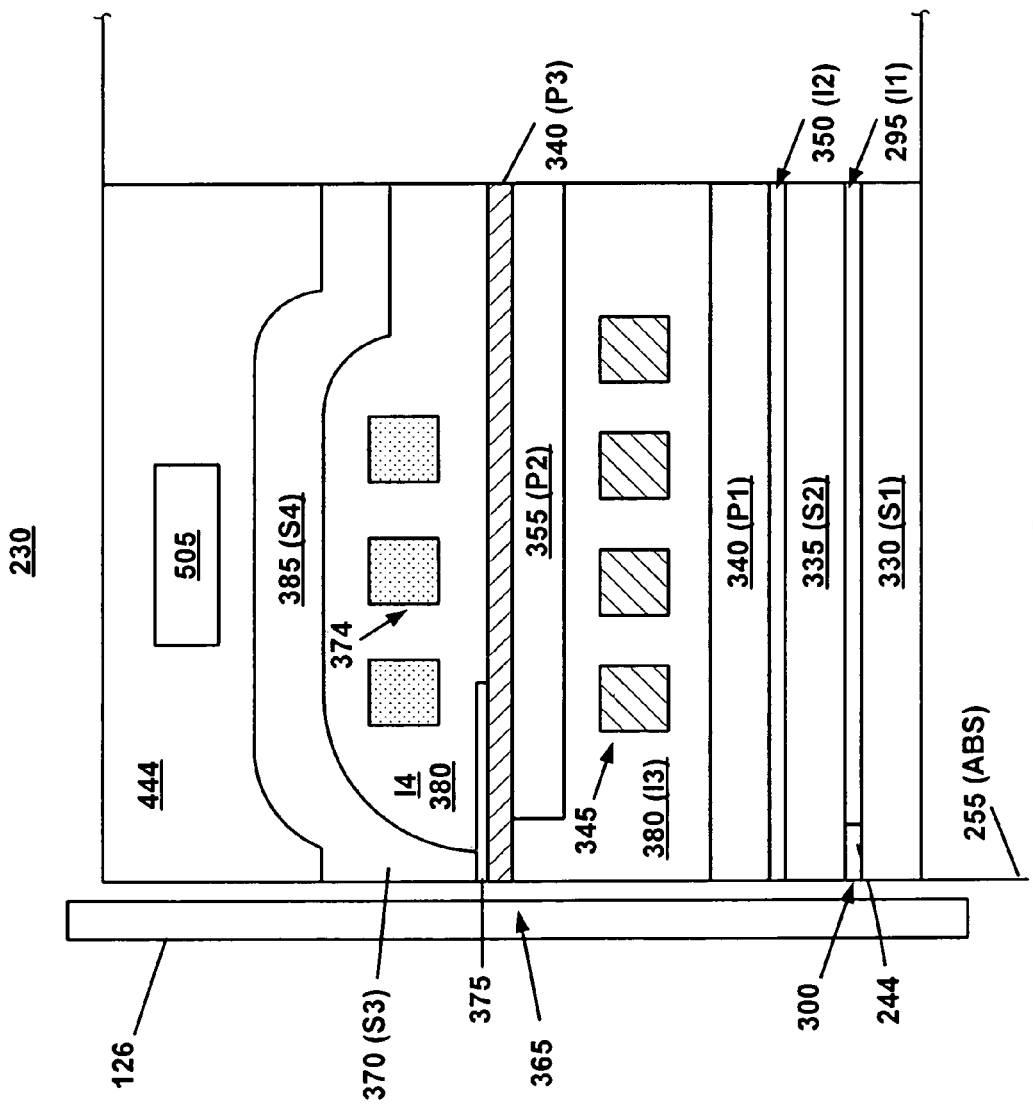
FIG. 7 is a cross-sectional view of the read/write head of FIGS. 1 and 2, showing the actuator located in an overcoat layer, according to another alternative embodiment of the present invention.

FIG. 6 illustrates an alternative embodiment of the present invention wherein the actuator 505 may be disposed behind the second coil layer 374. According to yet another alternative embodiment as illustrated in FIG. 7, the actuator 505 may also be placed above the upper shield S4 layer 385 and then is covered by an overcoat layer 444.

Figure 8:
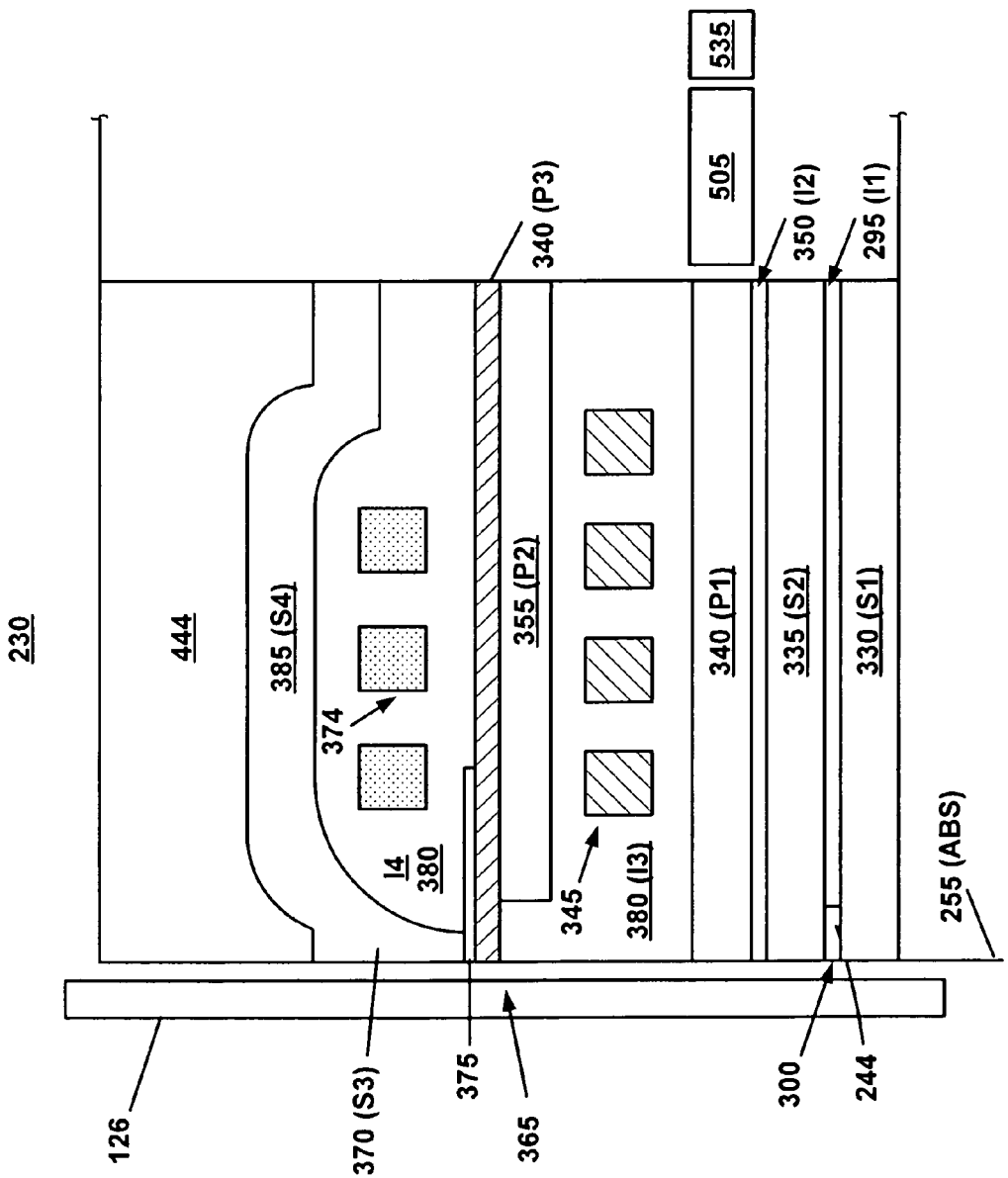
FIG. 8 is cross-sectional view of the read/write head of FIGS. 1 and 2, showing a stop layer placed behind the actuator of FIG. 4.

With reference to FIG. 8, according to a further embodiment of the present invention that can be applied to all the embodiments described earlier, (e.g., shown in FIGS. 3, 6, and 7), a stop layer 535 made of a non-magnetic material is disposed behind the actuator 505 and adjacent to the shorter edge 525 of the magnetostrictive plate 510 to substantially constrain the magnetostrictive plate 510 and to allow it to expand in the forward direction during actuation of the actuator 505. It should also be understood that the magnetic coils 530 may be positioned either above or below the magnetostrictive plate 510 without substantively affecting the functionality of the actuator 505.

Figure 9:
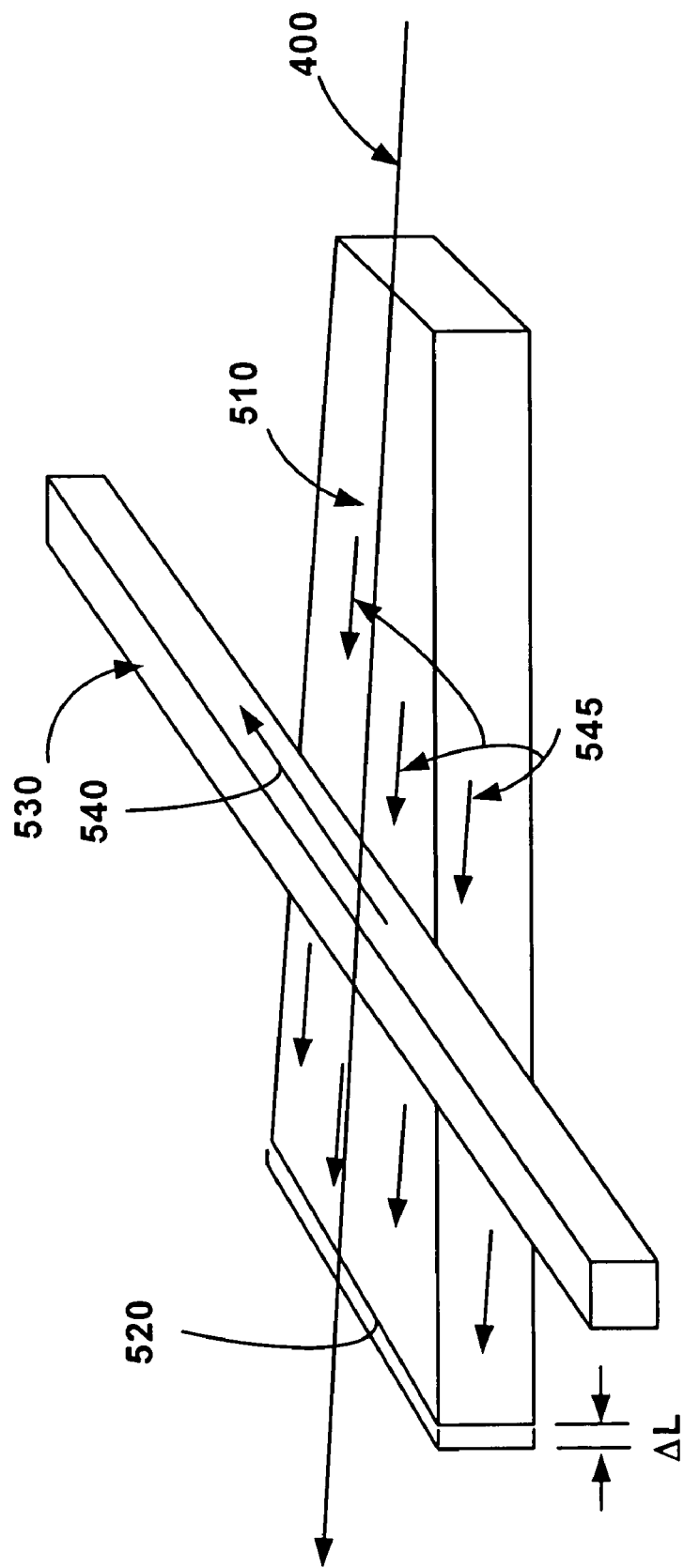
FIG. 9 is a diagram illustrating the working principle of the present invention.

Referring now to FIG. 9, it illustrates the working principle of the actuator 505 to enable the read/write head 80 to fly above the magnetic disk 126 at an ultra low flying height. During a read or write operation, an excitation voltage source supplies a current 540 to the actuator 505. The current 540 flows in a lengthwise direction through the magnetic coils 530. By induction, a magnetic field comprising of magnetic flux lines 545 is generated within the magnetostrictive plate 510. Using the well accepted right hand rule, the magnetic flux lines 545 must be perpendicular to the current 540, and thus are parallel to the axis 400 pointing toward the ABS.

Upon being magnetically saturated, the magnetostrictive plate 510 expands dimensionally according to the physics of magnetostriction. This dimensional expansion causes the length L as well as the other dimensions of the magnetostrictive plate 510 to elongate by an amount of ΔL. As a result, the read/write element 230 including the pole tip region 365 increases in length accordingly. A resulting protrusion of the pole tip region 365 is thereby created to displace the read/write element 230 in a closer proximity to the magnetic disk 126. By varying the amount of magnetic saturation impressed upon the magnetostrictive plate 510, it is possible to control the dynamic flying height of the read/write head 80 in a manner as to attain an ultra low flying height.

In operation, the actuator 505 is energized during a read or write operation. When the read/write head 310 is in an idle state, the excitation voltage is turned off to de-energize the actuator 505, whereupon the magnetostrictive plate 510 contracts to its original length L, thus causing the pole tip region to retract away from the magnetic disk 126. The flying height is therefore increased to maintain a nominal value.

In one embodiment, the excitation source 515 is continuously energized during the operation of the head, to compensate for manufacturing intolerances, such as when the flying height of the head is not within an acceptable tolerance range when operating at idle speed.

According to another embodiment, the excitation source 515 is selectively energized only during a read operation. According to yet another embodiment, the excitation source 515 is selectively energized only during a write operation.

In the present invention, the principal physical effect produced by the actuator 505 is an elongation of the magnetostrictive plate 510 to cause a protrusion of the pole tip region 365 for controlling the dynamic flying height of the read/write head 80. While this elongation is achieved by the effect of magnetostriction, it is also possible a combined effect of magnetostriction and thermal expansion could be employed in an alternative embodiment of the present invention.

According to another embodiment of the present invention, the coils 530 or additional coils, provide a heating effect to further control the dynamic flying height of the read/write head 80. The coils 530 may be made of high resistance elements that can carry the current to induce a magnetic field to saturate the magnetostrictive plate 510 and at the same time generate heat to transfer to the magnetostrictive plate 510 by means natural convection conduction. By selectively varying the resistance or the magnetic field strength in a combination, the magnetostrictive plate 510 is subjected to both sources of thermal and magnetostrictive expansion. The actuator 505 therefore has one additional control authority for achieving an ultra low dynamic flying height of the read/write head 80.

Figure 10:
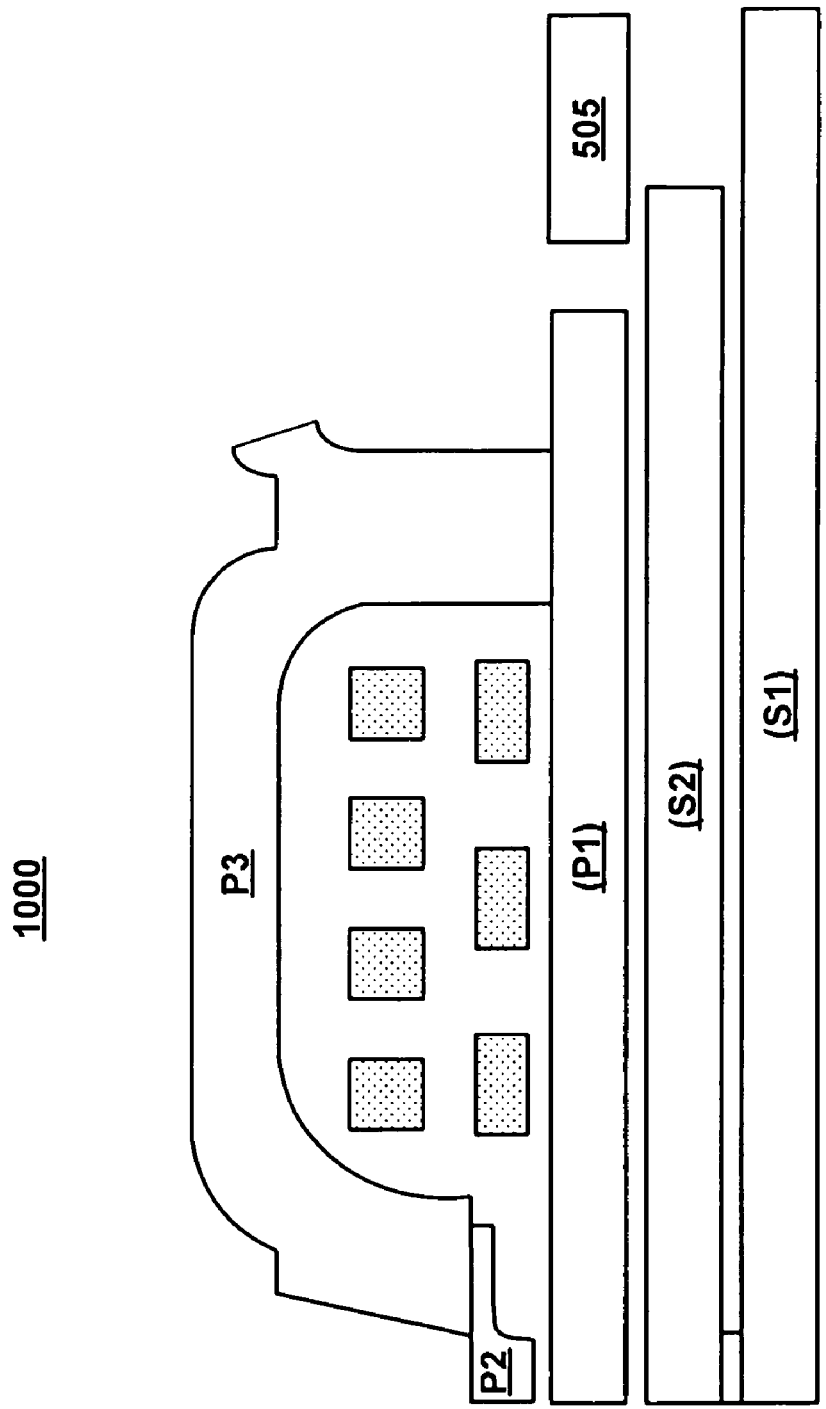
FIG. 10 is a cross-sectional view of an exemplary longitudinal recording read/write head, incorporating the actuator according to another embodiment of the present invention.

FIG. 10 shows an exemplary longitudinal recording read/write head 1000 that incorporates the actuator 505, to illustrate the fact that the present invention is applicable to both longitudinal and perpendicular recording heads. While the actuator 505 is shown in FIG. 10 as being disposed behind the first pole, P1, it should be clear that the actuator 505 may be positioned at any suitable location in the head 1000, as described earlier in connection with the perpendicular recording head 230 of FIG. 3.

What is claimed is:

1. A head for use in a data storage device including a storage medium having a recording surface, the head comprising:
   a pole tip region;
   an actuator including:
      an excitation source for generating a magnetic field; and
      a magnetostrictive plate for expanding in response to the magnetic field, resulting in a protrusion in a section of the pole tip region along a direction towards the recording surface; and
   a stop layer that is disposed behind the actuator, adjacent the magnetostrictive plate along the direction but opposite the protrusion.

2. The head of claim 1, wherein the excitation source comprises a coil.

3. The head of claim 2, wherein the magnetostrictive plate is placed in proximity to the coil, in order to saturate the coil when the coil is energized.

4. The head of claim 3, wherein the magnetostrictive plate is made of a material that is selected from the group consisting of one or a combination of: cobalt; nickel; iron; rare earth material; oxides of cobalt, nickel, iron, or rare earth materials; additives of oxygen, nitrogen, fluoride, or boron to cobalt, nickel, iron, or rare earth materials.

5. The head of claim 1, wherein the head comprises a first pole, P1, and wherein the actuator is disposed, at least in part, behind the first pole, P1.

6. The head of claim 1, wherein the head comprises a first pole, P1, and a second pole, P2, and wherein the actuator is disposed, at least in part, behind the second pole, P2.

7. The head of claim 1, wherein the head comprises a first pole, P1, a second pole, P2, and a third pole, P3, and wherein the actuator is disposed, at least in part, behind the third pole, P3.

8. The head of claim 1, wherein the head comprises a write gap disposed within the pole tip region, and wherein the actuator is disposed, at least in part, behind the write gap.

9. The head of claim 1, wherein the head comprises a read gap disposed within the pole tip region, and wherein the actuator is disposed, at least in part, behind the read gap.

10. The head of claim 1, wherein the head comprises a first shield, S1, and wherein the actuator is disposed, at least in part, behind the first shield, S1.

11. The head of claim 1, wherein the head comprises a first shield, S1 and a second shield, S2, and wherein the actuator is disposed, at least in part, behind the second shield, S2.

12. The head of claim 1, wherein the head comprises a first pole, P1; a second pole, P2; a third pole, P3; a write gap disposed within the pole tip region; a read gap disposed within the pole tip region; a first shield, S1; a second shield, S2; a write coil; and
   wherein the actuator is disposed, at least in part, behind any one or more of: the first pole, P1; the second pole, P2; the third pole, P3; the write gap; the read gap; the first shield, S1; the second shield, S2; and the write coil.

13. The head of claim 12, further comprising a third shield layer, S3, and a fourth shield layer, S4; and wherein the actuator is disposed at least in part, behind the fourth shield layer, S4.

14. The head of claim 1, further comprising an overcoat layer and wherein the actuator is disposed at least in part, behind the overcoat layer.

15. The head of claim 1, wherein the stop layer comprises a non-magnetic material.

16. The head of claim 1, wherein the expansion of the magnetostrictive plate is on the order of approximately 5 nm.

17. The head of claim 16, wherein a magnetostriction of the magnetostrictive plate is on the order of approximately $5 \times 10^{-5}$.

18. The head of claim 1, wherein the magnetostrictive plate has a generally rectangular shape.

19. The head of claim 1, wherein the magnetostrictive plate has a generally square shape.

20. The head of claim 1, wherein the magnetostrictive plate has a generally trapezoidal shape.

21. The head of claim 1, wherein the magnetostrictive plate has a generally elliptical shape.

22. The head of claim 1, wherein the excitation source begins to be energized upon initiation of a data read operation.

23. The head of claim 1, wherein the excitation source begins to be energized upon initiation of a data write operation.

24. The head of claim 1, wherein when the head is idle, the actuator is not energized.

25. The head of claim 1, wherein the head is a perpendicular recording head.

26. The head of claim 1, wherein the head is a longitudinal recording head.

27. The head of claim 1, wherein the excitation source is continuously energized during operation of the head, to compensate for flying height tolerance.

28. The head of claim 1, wherein the excitation source is selectively energized only during a read operation.

29. The head of claim 1, wherein the excitation source is selectively energized only during a write operation.

30. A disk drive comprising:
   a base;
   a spindle motor attached to the base;
   a disk having a recording surface and positioned on the spindle motor;
   a head stack assembly coupled to the base and comprising:
      an actuator body;
      an actuator arm cantilevered from the actuator body; and
      a read/write head coupled to the actuator arm, and including:
         a pole tip region; and
         an actuator including:
            an excitation source for generating a magnetic field; and
            a magnetostrictive plate for expanding in response to the magnetic field, resulting in a protrusion in a section of the pole tip region along a direction towards the recording surface; and
            a stop layer that is disposed behind the actuator, adjacent the magnetostrictive plate along the direction but opposite the protrusion.

31. The disk drive of claim 30, wherein the excitation source comprises a coil.

32. The disk drive of claim 31, wherein the magnetostrictive plate is placed in proximity to the coil, in order to saturate the coil when the coil is energized.

33. The disk drive of claim 32, wherein the magnetostrictive plate is made of a material that is selected from the group consisting of one or a combination of: cobalt; nickel; iron; rare earth material; oxides of cobalt, nickel, iron, or rare earth materials; additives of oxygen, nitrogen, fluoride, or boron to cobalt, nickel, iron, or rare earth materials.

34. The disk drive of claim 30, wherein the head comprises a first pole, P1, and wherein the actuator is disposed, at least in part, behind the first pole, P1.

35. The disk drive of claim 30, wherein the head comprises a first pole, P1, and a second pole, P2, and wherein the actuator is disposed, at least in part, behind the second pole, P2.

36. The disk drive of claim 30, wherein the head comprises a first pole, P1, a second pole, P2, and a third pole, P3, and wherein the actuator is disposed, at least in part, behind the third pole, P3.

37. The disk drive of claim 30, wherein the head comprises a write gap disposed within the pole tip region, and wherein the actuator is disposed, at least in part, behind the write gap.

38. The disk drive of claim 30, wherein the head comprises a read gap disposed within the pole tip region, and wherein the actuator is disposed, at least in part, behind the read gap.

39. The disk drive of claim 30, wherein the head comprises a first shield, S1, and wherein the actuator is disposed, at least in part, behind the first shield, S1.

40. The disk drive of claim 30, wherein the head comprises a first shield, S1 and a second shield, S2, and wherein the actuator is disposed, at least in part, behind the second shield, S2.

41. The disk drive of claim 30, wherein the stop layer comprises a non-magnetic material.

42. The disk drive of claim 40, wherein the expansion of the magnetostrictive plate is on the order of approximately 5 nm.

43. The disk drive of claim 42, wherein a magnetostriction of the magnetostrictive plate is on the order of approximately $5 \times 10^{-5}$.

44. The disk drive of claim 30, wherein the magnetostrictive plate has a generally rectangular shape.

45. The disk drive of claim 30, wherein the magnetostrictive plate has a generally square shape.

46. The disk drive of claim 30, wherein the magnetostrictive plate has any of a generally trapezoidal shape or a generally elliptical shape.

47. The disk drive of claim 30, wherein the excitation source begins to be energized upon initiation of a data read operation.

48. The disk drive of claim 30, wherein the excitation source begins to be energized upon initiation of a data write operation.

49. The disk drive of claim 30, wherein when the head is idle, the actuator is not energized.

50. The disk drive of claim 30, wherein the head comprises a first pole, P1; a second pole, P2; a third pole, P3; a write gap disposed within the pole tip region; a read gap disposed within the pole tip region; a first shield, S1; a second shield, S2; a write coil; and
   wherein the actuator is disposed, at least in part, behind any one or more of: the first pole, P1; the second pole, P2; the third pole, P3; the write gap; the read gap; the first shield, S1; the second shield, S2; and the write coil.

51. The disk drive of claim 50, further comprising a third shield layer, S3, and a fourth shield layer, S4; and wherein the actuator is disposed at least in part, behind the fourth shield layer, S4.

52. The disk drive of claim 30, further comprising an overcoat layer and wherein the actuator is disposed at least in part, behind the overcoat layer.

53. The disk drive of claim 30, wherein the head is a perpendicular recording head.

54. The disk drive of claim 30, wherein the head is a longitudinal recording head.

55. The disk drive of claim 30, wherein the excitation source is continuously energized during operation of the head, to compensate for flying height tolerance.

56. The disk drive of claim 30, wherein the excitation source is selectively energized only during a read operation.

57. The disk drive of claim 30, wherein the excitation source is selectively energized only during a write operation.

\* \* \* \* \*